United States Patent [19]
Racosky

[11] Patent Number: 5,478,140
[45] Date of Patent: Dec. 26, 1995

[54] SINGLE BEARING SKATE WHEEL CORE

[75] Inventor: Michael D. Racosky, Boulder, Colo.

[73] Assignee: Thorodin, Incorporated, Boulder, Colo.

[21] Appl. No.: 151,867

[22] Filed: Nov. 15, 1993

[51] Int. Cl.⁶ ..................................................... B60B 27/00
[52] U.S. Cl. .......................................... 301/5.7; 301/105.1
[58] Field of Search ............................. 280/11.22, 11.23; 301/5.3, 5.7, 105.1, 108.1, 108.4

[56] References Cited

U.S. PATENT DOCUMENTS

| | | |
|---|---|---|
| 1,469,344 | 10/1923 | Ware . |
| 1,549,509 | 8/1925 | Schluesselberg ........................ 301/5.7 |
| 1,743,757 | 1/1930 | Chesnutt . |
| 1,778,850 | 10/1930 | Duisenberg ......................... 280/11.22 |
| 1,808,047 | 6/1931 | Littleton, Jr. et al. . |
| 1,895,093 | 1/1933 | Carlson . |
| 1,983,869 | 12/1934 | Nichol . |
| 2,291,600 | 8/1942 | Atkinson . |
| 2,304,944 | 12/1942 | Martinec ................................. 301/5.7 |
| 2,377,855 | 6/1945 | Ambrosini . |
| 2,430,533 | 11/1947 | Reich . |
| 2,467,437 | 4/1949 | Martinec . |
| 2,476,193 | 7/1949 | Hirschmugl ............................. 301/5.7 |
| 2,517,322 | 8/1950 | Kahle ........................ 280/11.23 X |
| 2,572,835 | 10/1951 | Bloom ...................................... 301/5.7 |
| 2,649,337 | 8/1953 | Ware ........................................ 301/5.7 |
| 3,823,952 | 7/1974 | Kukulowicz .................... 280/11.22 X |
| 4,114,952 | 9/1978 | Kimmell ................................. 301/5.7 |
| 4,130,320 | 12/1978 | Scardenzan . |
| 4,219,240 | 8/1980 | Brandenstein et al. . |
| 4,603,025 | 7/1986 | Landay et al. . |

FOREIGN PATENT DOCUMENTS

| | | |
|---|---|---|
| 28883 | 11/1905 | Austria . |
| 197807 | 7/1978 | France . |
| 567043 | 8/1931 | Germany ............................... 152/409 |
| 817083 | 8/1951 | Germany ............................... 152/413 |
| 445099 | 9/1948 | Italy . |
| 145609 | 6/1954 | Sweden . |
| 197802 | 2/1972 | Switzerland . |
| 489812 | 8/1937 | United Kingdom . |

Primary Examiner—Russell D. Stormer
Attorney, Agent, or Firm—Donald W. Margolis; John L. Isaac

[57] ABSTRACT

A core assembly is disclosed to form a hub for a single bearing skate wheel. The core assembly includes a unitary core member having a radially inner portion defining an axial opening extending therethrough. An annular shoulder surrounds the axial opening and defines a socket which is sized and shaped to receive a single self-contained bearing therein. The socket is positioned to align the center line of the bearing with the center line of the core member when the bearing is disposed within the socket. A bearing retainer member is also provided for removably securing the bearing within the socket. Finally, a member is disposed axially outwardly of the socket for securely locking the retainer mechanism in place within the core assembly.

19 Claims, 3 Drawing Sheets

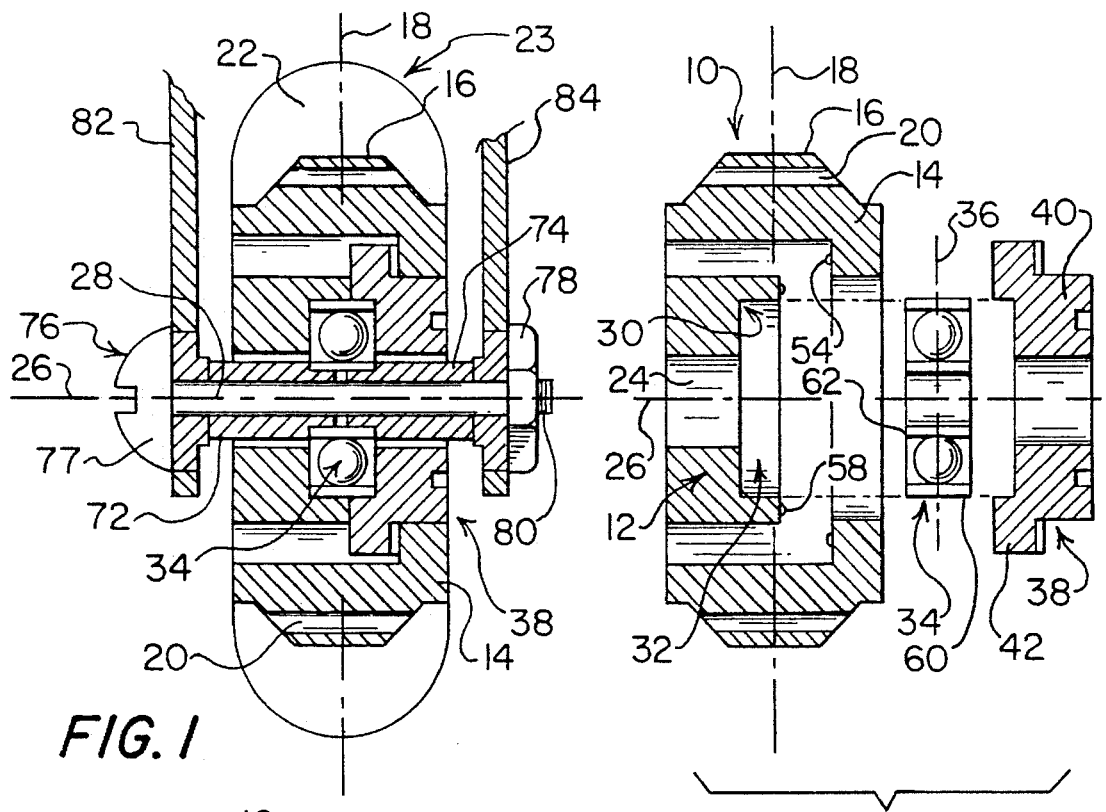
FIG. 1
FIG. 2
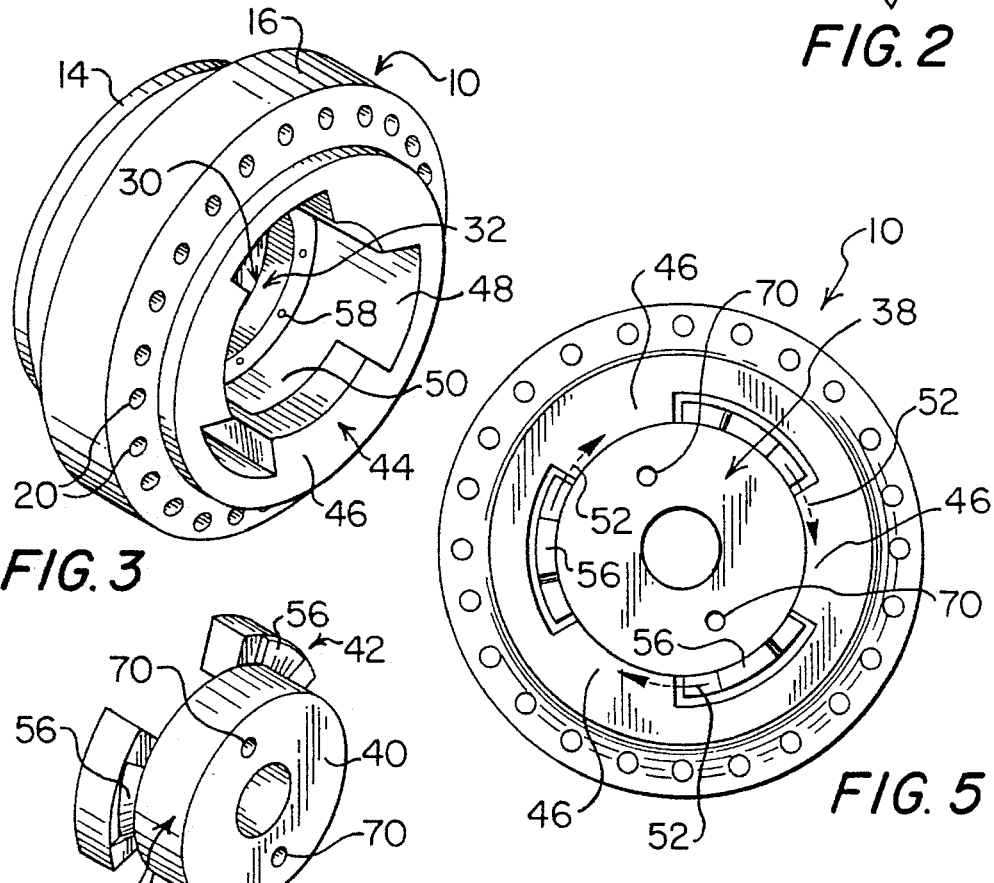
FIG. 3
FIG. 4
FIG. 5

SINGLE BEARING SKATE WHEEL CORE

BACKGROUND OF THE INVENTION

1. Field of the Invention

The present invention relates generally to skate wheels and, more particularly, to single bearing skate wheels for use, for example, with roller skates, skate boards, inline skates and the like. Specifically, the present invention relates to an improved single bearing core assembly for inline skate wheels.

2. Description of the Prior Art

Skate wheels have embodied a wide variety of designs and configurations over the years and have been utilized in numerous different applications such as roller skates, skate boards, inline skates, street hockey skates and the like. Single bearing skate wheels have been taught in early applications of wheels for roller skates and the like, as illustrated in U.S. Pat. Nos. 1,469,344; 1,743,757; 1,983,869 and 2,291,600, and Austrian Patent No. 28,883. These roller skate wheels were typically made from metal components having metal or hard rubber tire portions. The bearing members utilized in these references are not individual, self-contained units which are replaceable, but are integral to the wheel assembly itself.

Further evolution and design modifications of the roller skate wheel are illustrated in U.S. Pat. Nos. 2,377,855; 4,130,320 and 4,603,025. All of these patents illustrate single bearing skate wheels having the center line of the bearing offset from the center line of the wheel member itself.

As the demands on the skate wheel became more severe and functionally more competitive, as in the form of inline skates, racing roller skates and the like, light weight plastic cores, for example of nylon, were designed to support the bearing and axle assembly. Given the fact that the materials of the skate wheel were becoming lighter yet the demands on the skates were becoming greater, wheel constructions were devised which utilized pairs of bearing members in each roller wheel, for example, as disclosed in U.S. Pat. No. 4,219,240. In such designs, the two bearing members generally support the axle and include a spacer between the bearings allowing the axle bolt to be tightened without inhibiting wheel rotation. This can be accomplished because the bearing spacer is pressed against the inner bearing races permitting the wheel to freely role. Each bearing used in such two bearing member designs are typically capable of individually handling the thrust and axial loads encountered during normal skate use, thereby providing loading capabilities which far exceed the loads produced when the wheels are actually used for skating. Thus, the state of the art two-bearing skate wheel core design is greatly over engineered for roller skate or inline skate purposes. However, the single-bearing designs of today have been inadequate in providing a roller wheel which is light-weight yet rugged. Consequently, and particularly in the inline roller skate industry, there is a need for an inexpensive light-weight skate wheel having modular parts, including self-contained, replaceable bearings, which is also rugged, low in roller resistance so that it allows maximum speed.

SUMMARY OF THE INVENTION

Accordingly, it is one object of the present invention to provide an improved core assembly for a skate wheel having a single bearing.

Another object of the present invention is to provide a single bearing skate wheel which is modular in form so as to permit the ready replacement of bearings.

Still another object of the present invention is to provide a single bearing skate wheel having the center line of the single bearing aligned with the center line of the wheel core.

Yet another object of the present invention is to provide an improved, single bearing, self-contained core assembly for use with a skate wheel.

To achieve the foregoing and other objects and advantages, and in accordance with the purposes of the present invention as embodied and broadly described herein, a core assembly is provide to form a hub for a single bearing skate wheel. The core assembly includes a unitary cylindrical core member having a radially inner portion defining an axial opening extending therethrough. An annular shoulder surrounds the axial opening and defines a socket which is sized and shaped to receive a single self-contained bearing therein. The socket is positioned to align the center line of the bearing with the center line of the core when the bearing is disposed within the socket. A bearing retainer mechanism is also provided for easily removably securing the bearing within the socket. Finally, a mechanism is disposed axially outwardly of the socket for securely locking the retainer member in place within the core assembly.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings which are incorporated in and form a part of the specification, illustrate and explain complete preferred embodiments of the present invention, together with descriptions according to the best modes presently devised for the practical application of the principles thereof, and in which:

FIG. 1 is a cross-sectional view of a skate wheel mounted on an inline roller skate blade member, and illustrating a core assembly constructed in accordance with the present invention;

FIG. 2 is a cross-sectional, exploded view of the core assembly of FIG. 1.

FIG. 3 is a right side perspective view of the disassembled core assembly of FIG. 2;

FIG. 4 is a right side perspective view of a retainer ring utilized with the core assembly of FIG. 3;

FIG. 5 is a front elevational view schematic representation of the core assembly of FIG. 3 illustrating the retainer of FIG. 4 positioned for location within the core assembly;

DETAILED DESCRIPTION OF THE PREFERRED EMBODIMENTS

Figure 6:
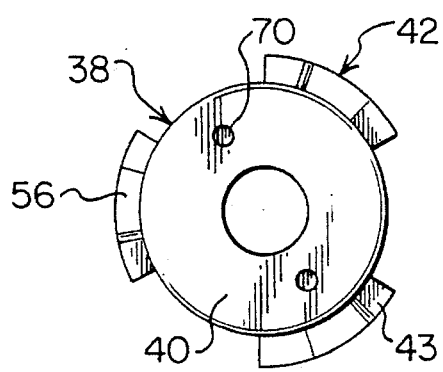
FIG. 6 is a front elevational view of a retainer ring embodiment constructed in accordance with the present invention.
Figure 7:
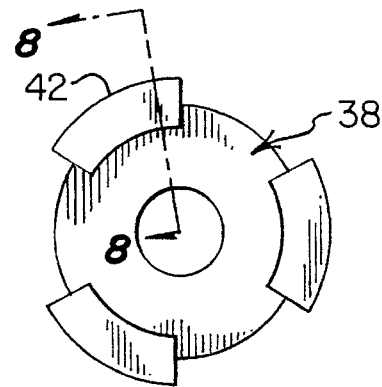
FIG. 7 is a rear elevational view of the retainer ring of FIG. 6.
Figure 8:
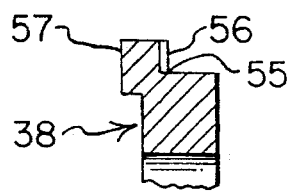
FIG. 8 is a cross-sectional view of a portion of the retainer ring of FIGS. 6 and 7 taken along line 8—8 of FIG. 7.
Figure 9:
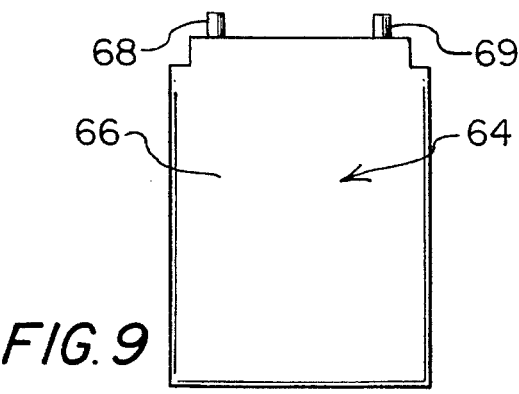
FIG. 9 is a perspective view of a key assembly which is designed for use in locking and unlocking the retainer ring of FIGS. 4, 6 and 7 into the core assembly of FIGS. 3 and 5.
Figure 10:
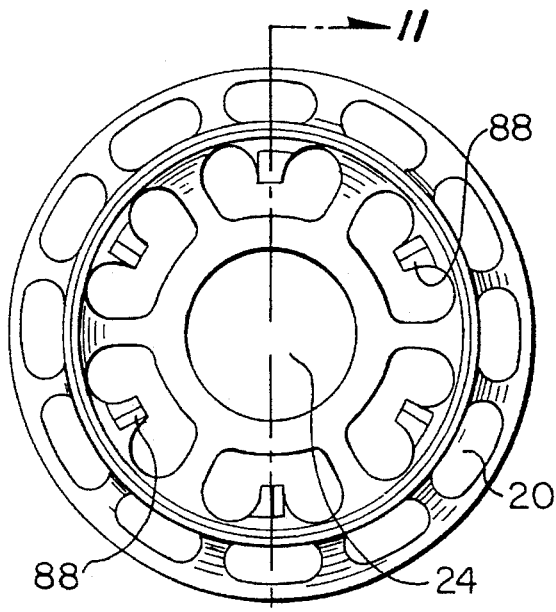
FIG. 10 is a front elevational view of an alternative embodiment of a core assembly constructed in accordance with the present invention.
Figure 11:
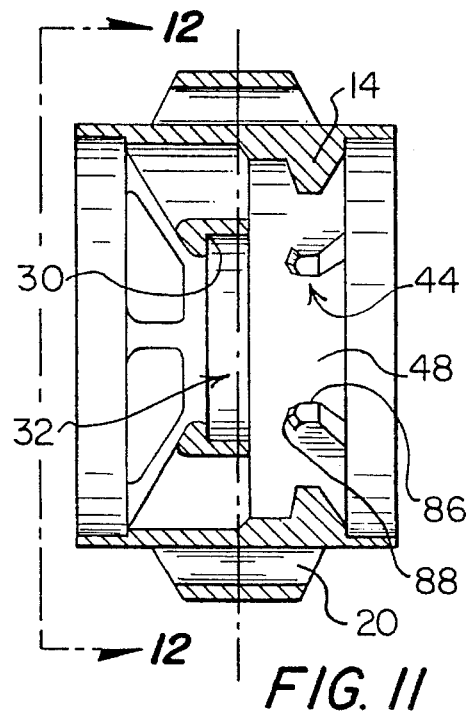
FIG. 11 is a cross-sectional view taken substantially along line 11—11 of FIG. 10.
Figure 12:
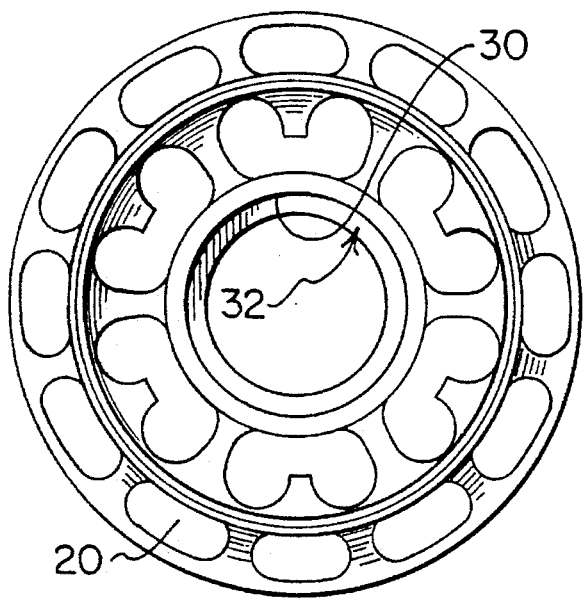
FIG. 12 is a rear elevational view of the core assembly of FIG. 11 taken substantially along line 12—12 of FIG. 11.

Referring first to FIGS. 1–9, a core assembly 10 is illustrated constructed in accordance with the present invention. In one preferred form, the core assembly 10 includes a unitary core member 12 which defines an annular member. The core member 12 may be constructed from any desired material but is preferably plastic such as 6 nylon, impact modified nylon, glass filled nylon and the like. The core member 12 includes a main cylindrical member 14. Cylindrical member 14 has a radially inner portion defining an axial opening extending through cylinder 14. An outer radial ring or rim portion 16 is integral with and coaxially aligned with the center line of cylinder member 14. The outer ring 16 includes a plurality of apertures 20. As is known in the art, apertures 20 can be utilized to interlock core member 12 with tire portion 22 to form a skate wheel 23. Tire portion 22 may be constructed from solid rubber, plastic or any other desired art known material or structure. Where tire 22 is of solid thermoplastic material, tire 22 is molded about the radially outer portion 16 so that it passes through apertures 20 and is firmly interlocked with core member 12.

An axial opening 24 is provided having a center axis 26 which is transverse to center line 18 of core member 12. The opening 24 is provided to enable an axle 28 to pass therethrough and provide an axis of rotation for tire 22. The opening 24 expands radially in the interior of core member 14 so as to form an annular shoulder 30. Shoulder 30 defines a socket 32 which is sized and shaped to receive a self-contained bearing member 34. Socket 32 is sized so that bearing 34, as it is positioned within socket 32 and nested against shoulder 30 is aligned so that center line 36 of bearing 34 is aligned with center line 18 of unitary member 12, as is most clearly shown in FIG. 1.

A bearing retainer member 38 is provided to lock bearing 34 in place within socket 32. In preferred embodiments, retainer member 38 includes an annular pressure member 40 having a plurality of tabs 42 which extend radially outwardly. In the embodiment illustrated in FIGS. 1–9, pressure member 40 is in the form of a ring, and tabs 42 are in the form of annularly elongated ears 43. The core member 14 includes a plurality of locking members 44 which are adapted to receive tabs 42 in locking engagement in order to hold pressure member 38 in position and to exert pressure against bearing 34. In one preferred form, locking member 44 includes a plurality of lips 46 which are disposed on the inner circumferential surface 48 of core member 14 and are spaced so as to provide slots 50 into which ears 43 may be rotated. As particularly illustrated in FIG. 5, retainer member 38 is shown positioned within core member 14 with ears 43 located in-between lips 46 with retainer member 38 ready for rotation. Retainer member 38 is then rotated, in this instance clockwise, as shown by arrows 52, so as to slide ears 43 into slots 50 defined by lips 46.

A mechanism is provided so that as retainer member 38 is rotated, the axial pressure exerted by retainer plate 38 against bearing 34 increases. One such key mechanism which is shown is in the form of a button or nipple 54 positioned on the underside of each lip 46. Nipple 54 engages the upper surface 55 of each ear 43 as it is rotated within slot 50. This engagement exerts axial pressure inwardly against bearing 34. Another mechanism which assists in providing this function is wedge member 56 disposed on the bottom surface 57 of each ear 43. Wedge 56 engages the bottom surface 58 of locking members 44. The further the ear 43 is rotated into slot 50, the greater the pressure exerted by the increasing slope of wedge 56, thereby allowing pressure member 40 to provide selective axial pressure against bearing 34. It should be noted that this axial pressure against bearing 34 is exerted only against outer race 60 of bearing 34, leaving inner race 62 unencumbered to freely rotate within outer race 60.

In the embodiment illustrated in FIGS. 1–9, the pressure ring 40 is rotated utilizing a key 64. Key 64 includes a handle 66 which is readily grasped by an individual and a pair of projections 68 which are positioned to be received within and interlock with apertures 70 which are defined within the surface of pressure ring 40. In this manner, key 64 may be utilized to engage pressure ring 40 and to rotate it firmly into or out of position as discussed above.

Once bearing 34 and retainer plate 38 have been locked into position within unitary core member 14, a pair of wheel spacers 72, 74 are inserted from each side of core member 14 within the opening 24 so as to fill the space between unitary core member 14 and inner race 62, and axle 28. In the illustrated embodiment of FIGS. 1–9, axle 28 is in the form of a bolt 76 having a head portion 77 and nut 78 threadably secured to the terminal threads 80 of bolt. The bolt 76 is utilized to secure skate wheel 23 to a pair of inline blade frames 82, 84 which extend down from the base of a roller skate, or in this form an inline roller skate. In this manner, the shaft or axle 28 is firmly secured to the frames 82, 84 yet due to spacers 72, 74, inner race 62 is free to rotate about axle 28.

Figure 13:
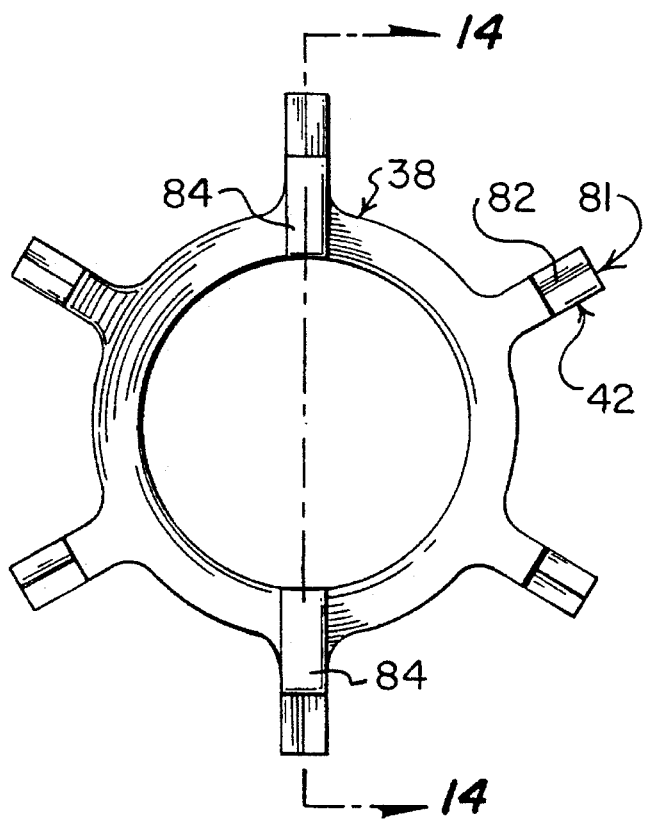
FIG. 13 is a front elevational view of a retainer ring designed for use for retaining a bearing within the alternative embodiment core assembly of FIG. 11.
Figure 14:
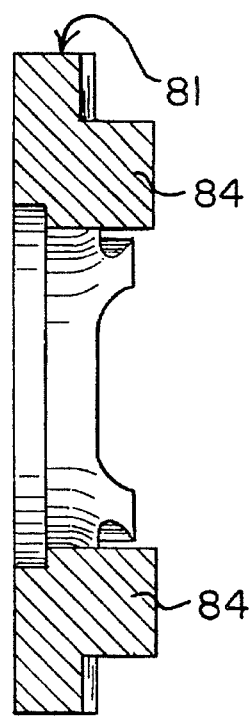
FIG. 14 is a cross-sectional view of the retainer ring of FIG. 13 taken along line 14—14 of FIG. 13.

Turning now to FIGS. 10–14, an alternate embodiment for a bearing retainer member 38 and locking mechanism 44 are illustrated and described. In this particular alternate embodiment, bearing retainer member 38, as illustrated in FIGS. 13 and 14, is in the form of a pressure ring having a plurality of tabs 42 projecting radially outwardly therefrom. In this instance, however, each tab 42 is in the form of a finger 81 having a V-notched member 82 at the distal end thereof. Moreover, a ledge 84 extends axially outwardly to provide leverage surfaces for the fingers of an operator to rotate retainer member 38 to lock it into place, thereby avoiding the need for a key to lock and to unlock bearing retainer member 38 in this embodiment.

The locking members 44 disposed along the interior circumferential surface 48 of core member 14 are in the form of plurality of projections 86 which are oriented radially inwardly from the surface 48. Each projection 86 includes a wedge-like member 88 at its terminal end which is sized and shaped to engage the V-slot 82 of a finger 81. Thus, plate 38 is positioned within core member 14 and then rotated clockwise as with the previous embodiment. However, the ledges 84 allow an operator to rotate the retainer 38 without the need of a key. As retainer plate 38 is rotated, fingers 81 engage projections 86 such that wedges 88 firmly engage V-slots 82 and hold retainer plate 38 in position within core member 14. This arrangement exerts axial pressure against bearing 34 as with the previous embodiment.

It is thus seen that the above embodiments of the present invention teach and provide a single bearing skate wheel which is both easily assembled as well as readily repaired, for instance where the bearing or the tire may wear out or be damaged. This is achieved because each bearing is a self-contained, and is capable of being easily accessed, and then easily removed and a substitute dropped into place within the roller skate wheel. In either instance, this self-contained bearing member may be readily replaced relative to the core of the roller skate wheel. The arrangement of the present invention is adaptable to any skate wheel core for use in roller skates, skate boards and inline skates, although the invention is particularly suitable for inline skates. The arrangement of the invention substantially reduces the cost of skate manufacture inasmuch as it decreases, by half, the number of bearings needed for each wheel, as compared to a double-bearing arrangement which is typically used in modern skate wheels. The structure of the core of present invention, as detailed above, also substantially enhances the protection of the bearing from dirt and grime. Since each roller bearing has its inherent rolling resistance, the rolling resistance of a single bearing is reduced as compared to the rolling resistance of a two bearing system. The weight of the system is also reduced by reducing the number of bearings in the wheel. This provides an enhanced performance to the wheel and to the skate product with which it is used. The lesser number of parts also assists in inventory control and in ease of assembly, thereby reducing the cost of the wheel and in the cost of labor in manufacturing the wheel.

Finally, the arrangement of the core of the present invention enables alignment of the center line of the single bearing with the center line of the skate wheel. This substantially enhances the performance of the skate wheel product particularly in the instance of an inline skate where all of the wheels are aligned along the same single center line. If all the bearings are so aligned, as can be achieved by the use of the present invention, such an arrangement provides substantially greater control over the skate product by the user thereof. Moreover, by establishing the center line relationship, the profile of a wheel can be of any reasonable width dimension with regard to the bearing, because with the bearing being uniformly loaded, the wheel will also be uniformly loaded.

As can be seen from the above, that the present invention provides a skate wheel with enhanced performance due to the reduced number of bearings. This reduction in bearings reduces the weight, the rolling resistance of the wheel, the number of parts, the cost of the wheel, and simplifies the manufacturing of the wheel. Moreover, when used with an inline skate product, the inline skate product is particularly enhanced by the present invention due to the alignment along the center line of the product of all the bearings of the wheels as well as the alignment of the wheels themselves. This provides for uniform wear and uniform loading of the core and bearing of each wheel. The present invention also simplifies use of the skate wheel due to the modular nature of the product and ease of replacement of bearings in the instance of premature or excessive wear or damage. Finally, the various embodiments of the present invention significantly reduce the cost of manufacture of the skate product both in a number of parts as well as in the labor of assembly, thereby providing greater profit to the manufacturer and less expense to the user.

The foregoing exemplary descriptions and the illustrative preferred embodiments of the present invention have been shown in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

The embodiments of the invention in which an exclusive property or privilege is claimed are defined as follows:

1. A core assembly to form a hub for a single bearing skate wheel, said core assembly including:

a core member having a body member having an axis and a radially inner cylindrical portion defining an axial opening extending through said body member to define a first end opening and a second end opening, said core member having a center line which is transverse to said axial opening and intermediate said first end opening and said second end opening;

an annular shoulder within said axial opening and defining a socket which is open to said first end opening and is sized and shaped to receive a single self contained bearing assembly having a center line, said shoulder being positioned to align the center line of such a single self contained bearing assembly with said center line of said core member when such a single self contained bearing assembly is disposed within said socket;

bearing retainer means for removable connection at said first end opening of said core member for removably securing such a single self contained bearing assembly within said socket;

said bearing retainer means including a pressure ring having an upper surface, a lower surface adapted to maintain a single self contained bearing assembly within said socket with the center line of such a single self contained bearing assembly aligned with the center line of said core member when disposed in said socket, an outer circumferential edge, and a plurality of annually spaced elongated ears having an upper surface and extending from said circumferential edge; and locking means disposed axially outwardly of said socket at said first end opening of said core member for securely locking said bearing retainer means in place within said core assembly, said locking means including a plurality of annular lips spaced radially inwardly from the body of said core member to form a plurality of annularly spaced slots sized and shaped to receive said ears as said ring is rotated about the axis of said core member, said locking means further including pressure increasing means in the form of a button disposed inwardly of each said lip surface adapted to engage the upper surface of said ears as said ring is rotated to increase axial pressure of said pressure ring against such a single self contained bearing assembly as said ring is rotated.

2. A core assembly to form a hub for a single bearing skate wheel, said core assembly including:

a core member having a body member having an axis and a radially inner cylindrical portion defining an axial opening extending through said body member to define a first end opening and a second end opening, said core member having a center line which is transverse to said axial opening and intermediate said first end opening and said second end opening;

an annular shoulder within said axial opening and defining a socket which is open to said first end opening and is sized and shaped to receive a single self contained bearing assembly having a center line, said shoulder being positioned to align the center line of such a single self contained bearing assembly with said center line of said core member when such a single self contained bearing assembly is disposed within said socket;

bearing retainer means for removable connection at said first end opening of said core member for removably securing such a single self contained bearing assembly within said socket, said bearing retainer means including a pressure ring having an upper surface, a lower surface adapted to maintain a single bearing within said socket with the center line of such a bearing aligned with the center line of said core member when disposed in said socket, an outer circumferential edge, and a plurality of fingers extending radially outwardly from said circumferential edge, each said finger including a V-slot disposed at the end thereof facing axially outwardly therefrom; and locking means disposed axially outwardly of said socket at said first end opening for securely locking said bearing retainer means in place within said core assembly, said locking means including a plurality of annularly spaced projections each including a wedge-like member disposed at the distal end thereof extending axially inwardly and adapted to engage the V-slots of said fingers as said pressure ring is engaged with said locking means to snap-lock said pressure ring in place.

3. A single bearing skate wheel having a tire and being rotatable about an axle, said wheel comprising:

an annular core member having an axis and having a radial outer portion including means for attachment of a tire thereto, and a radially inner cylindrical portion defining an axial opening extending through said body member to define a first end opening and a second end opening and adapted for receiving said axle, said core member having a center line which is transverse to said axial opening and intermediate said first end opening and said second end opening;

an annular shoulder within said axial opening and defining a socket which is open to said first end opening and is sized and shaped to receive a self contained single bearing assembly having a center line, an inner race and an outer race, said shoulder being positioned to align the center line of such a self contained single bearing assembly with said center line of said core member when such a self contained single bearing assembly is disposed within said socket; and bearing retainer means for removable connection at said first end opening of said core member for removably securing such a self contained single bearing assembly within said socket, said bearing retainer means including a device rotatable into position to exert axial pressure against said outer race of said self contained single bearing assembly to securely hold said outer bearing race within said socket for rotation with said tire while permitting free rotation of said inner race relative to said outer race.

4. The core assembly of claim 3, wherein said bearing retainer means comprises a pressure ring having an upper surface, a lower surface and an outer circumferential edge, said lower surface of said pressure ring adapted to maintain a single self-contained bearing assembly within said socket with the center line of such a bearing assembly aligned with said center line of said core member when such a bearing assembly is disposed within said socket.

5. The wheel of claim 4, wherein said pressure ring of said bearing retainer includes a plurality of tab members extending radially outwardly from said outer circumferential edge of said pressure ring, said locking means being adapted for receiving said tab members.

6. The wheel of claim 5 wherein said locking means comprises a plurality of annually spaced projections adapted to engage said tabs upon rotation of said pressure ring about said axis of said core member.

7. The wheel of claim 6 wherein said annually spaced projections of said locking means includes means for increasing the axial pressure of said ring against the outer race of such a self-contained bearing assembly as said ring is rotated about said axis of said core member into engagement with said projections.

8. The wheel of claim 7, wherein said pressure increasing means further includes a wedge member disposed on said upper surface of each said ear to increase axial pressure of said ring towards said socket as said ear is further engaged against said lip within said slot.

9. The wheel of claim 5, wherein said retainer means includes means to facilitate rotation of said pressure ring to engage said tabs with said locking means.

10. The wheel of claim 9, wherein said rotation facilitation means comprises two or more spaced apart apertures defined within said top surface of said pressure ring, and a rotation key member having a body of sufficient size to be gripped by an individual and two or more spaced apart projections positioned to engage two or more of said apertures in said top surface of said pressure ring for rotation thereof relative to said locking means.

11. The wheel of claim 9, wherein said rotation facilitation means comprises a portion of said surface of said pressure ring which is adapted to be engaged by the hand of a person to permit manual rotation of said pressure ring relative to said locking means.

12. The wheel of claim 11, wherein said portion of said surface of said pressure ring which is adapted to be engaged by the hand of a person includes a plurality of ledges with each said ledge extending radially outwardly from one said tab to allow engagement by the hand of a person to permit manual rotation of said pressure ring relative to said locking means.

13. The wheel of claim 11, wherein said assembly further includes a single self-contained bearing assembly having a center line which is positioned within said socket on said annular shoulder within said axial opening with said center line of said single self contained bearing assembly aligned with said center line of said core member, and with said bearing retainer means removably securing single self contained bearing assembly within said socket.

14. The wheel of claim 3, wherein said self-contained bearing assembly has an outer race abutting against said shoulder within said socket, an inner race adapted to freely rotate within said outer race, and a center opening coaxial with the axial opening extending through said core member.

15. The wheel of claim 3, wherein said first end opening of said core member includes locking means for securely locking said bearing retainer means in place within said core assembly.

16. The wheel of claim 15, wherein said locking means at said first end opening of said core member is disposed axially outwardly of said socket.

17. The skate wheel of claim 3, wherein said retainer device comprises a pressure member sized and shaped to engage said outer race, and a plurality of annually spaced tabs extending radially outwardly from said pressure member for engagement with said locking means.

18. The skate wheel of claim 3, wherein a tire is attached to said attachment means of said radial outer portion of said annular core member.

19. The skate wheel of claim 3, wherein said bearing is mounted on an axle which extends axially through said first end opening and said second end opening of said annular core member, and transverse to said center line of said core member.

* * * * *